(12) United States Patent
Zhang et al.

(10) Patent No.: US 10,720,982 B2
(45) Date of Patent: Jul. 21, 2020

(54) MEASUREMENT OF BEAM REFINEMENT SIGNAL

(71) Applicant: INTEL IP CORPORATION, Santa Clara, CA (US)

(72) Inventors: Yushu Zhang, Beijing (CN); Huaning Niu, San Jose, CA (US); Sameer Pawar, Santa Clara, CA (US); Gang Xiong, Portland, OR (US); Rui Huang, Beijing (CN)

(*) Notice: Subject to any disclaimer, the term of this patent is extended or adjusted under 35 U.S.C. 154(b) by 0 days.

(21) Appl. No.: 16/349,957

(22) PCT Filed: Dec. 29, 2017

(86) PCT No.: PCT/US2017/069081
§ 371 (c)(1),
(2) Date: May 14, 2019

(87) PCT Pub. No.: WO2018/128944
PCT Pub. Date: Jul. 12, 2018

(65) Prior Publication Data
US 2019/0334611 A1   Oct. 31, 2019

Related U.S. Application Data

(60) Provisional application No. 62/442,871, filed on Jan. 5, 2017.

(51) Int. Cl.
| | |
|---|---|
| *H04B 7/08* | (2006.01) |
| *H04B 17/318* | (2015.01) |
| *H04W 72/04* | (2009.01) |
| *H04B 17/382* | (2015.01) |

(52) U.S. Cl.
CPC .......... *H04B 7/0851* (2013.01); *H04B 7/086* (2013.01); *H04B 17/318* (2015.01); *H04B 17/382* (2015.01); *H04W 72/046* (2013.01)

(58) Field of Classification Search
CPC combination set(s) only.
See application file for complete search history.

(56) References Cited

U.S. PATENT DOCUMENTS

| | | | |
|---|---|---|---|
| 7,787,556 B2 * | 8/2010 | Zhang | H04B 7/0854 375/267 |
| 10,484,152 B2 * | 11/2019 | Lee | H04L 5/0023 |

(Continued)

FOREIGN PATENT DOCUMENTS

WO  2015176679 A1  11/2015

OTHER PUBLICATIONS

Intel Corporation; R1-1609514; Reference Signal and Procedure for UE Beam Refinement (BM P-3); 3GPP TSG-RAN WG1 #86bis; Lisbon, Portugal; Oct. 10-14, 2016.

(Continued)

*Primary Examiner* — Linda Wong

(57) ABSTRACT

Technology for a user equipment (UE) operable to enhance the receiving performance of a reference signal for beam refinement is disclosed. The UE can determine a receiving beam sweeping structure for each receiving beam of a plurality of receiving beams. The UE can calculate the receiving power rj for each of the plurality of receiving beams. The UE can select a refined receiving beam having a highest receiving power rj.

24 Claims, 11 Drawing Sheets

(56) References Cited

U.S. PATENT DOCUMENTS

| | | | |
|---|---|---|---|
| 2005/0088959 A1* | 4/2005 | Kadous | H04L 1/0003 370/208 |
| 2005/0265275 A1* | 12/2005 | Howard | H04B 7/0417 370/328 |
| 2010/0091919 A1* | 4/2010 | Xu | H04L 5/0092 375/346 |
| 2011/0038308 A1* | 2/2011 | Song | H04B 7/0408 370/328 |
| 2013/0094619 A1* | 4/2013 | Shellhammer | H04L 27/2656 375/343 |
| 2015/0270889 A1* | 9/2015 | Shoshan | H04B 7/0617 370/315 |
| 2016/0087706 A1* | 3/2016 | Guey | H04B 7/0617 375/267 |
| 2016/0360463 A1 | 12/2016 | Kim | |
| 2017/0012729 A1* | 1/2017 | Thomas | H04J 11/0069 |
| 2017/0048775 A1* | 2/2017 | Kim | H04W 76/18 |
| 2017/0156108 A1* | 6/2017 | Kim | H04B 7/0628 |
| 2017/0331670 A1* | 11/2017 | Parkvall | H04W 52/0245 |
| 2018/0083719 A1* | 3/2018 | Kim | H04L 25/02 |
| 2018/0109305 A1* | 4/2018 | Obara | H04B 7/04 |
| 2018/0115355 A1* | 4/2018 | Nagata | H04W 16/28 |
| 2018/0138590 A1* | 5/2018 | Uchida | H04B 7/0413 |
| 2018/0309495 A1* | 10/2018 | Xiong | H04J 11/00 |
| 2019/0058558 A1* | 2/2019 | Lee | H04L 27/2613 |
| 2019/0159154 A1* | 5/2019 | Kim | H04W 56/001 |

OTHER PUBLICATIONS

TS V5G.211 V1.3; Verizon 5G TF; Air Interface Working Group; Physical channels and modulation (Release 1); (Jun. 2016).

\* cited by examiner

```
                                    ┌─────────────────────────────────┐
                                    │ determine a receiving beam      │
                                    │ sweeping structure for each     │
                                    │ receiving beam of a plurality   │
                                    │ of receiving beams, comprising: │
                                    │ sample the beam sweeping        │
                                    │ structure that comprises a      │
                                    │ cyclic prefix (CP) and a        │
                                    │ plurality of data repetitions,  │
                                    │ wherein:                        │
                                    │ each receiving beam is          │
                                    │ associated with $N + N_{CP}/N_{RPF}$ │
                                    │ samples, wherein N is a length  │
                                    │ of a data repetition, $N_{CP}$ is │── 410
                                    │ a CP length, and $N_{RPF}$ is a  │
                                    │ number of data repetitions,     │
                                    │ and wherein each of $N$, $N_{CP}$, │
                                    │ $N_{RPF}$ is an integer greater  │
                                    │ than 0;                         │
                                    │ a first receiving beam of the   │
                                    │ plurality of receiving beams    │
                                    │ includes at least a portion of  │
                                    │ a cyclic prefix (CP) and at     │
                                    │ least a portion of a data       │
                                    │ repetition of the plurality of  │
                                    │ data repetitions; and           │
                                    │ each of a $N_{RPF} - 1$ receiving │
                                    │ beams of the plurality of       │
                                    │ receiving beams positioned      │
                                    │ after the first receiving beam  │
                                    │ includes at least a portion of  │
                                    │ two adjacent data repetitions   │
                                    └─────────────────────────────────┘
                                                    │
                                                    ▼
                                    ┌─────────────────────────────────┐
                                    │ calculate the receiving power   │
                                    │ $r_j$ for each of the plurality │
                                    │ of receiving beams, wherein r   │── 420
                                    │ is a real number and j is a set │
                                    │ of integers greater than or     │
                                    │ equal to 1 and less than or     │
                                    │ equal to $N_{RPF}$              │
                                    └─────────────────────────────────┘
                                                    │
                                                    ▼
                                    ┌─────────────────────────────────┐
                                    │ select a refined receiving beam │── 430
                                    │ having a highest receiving      │
                                    │ power $r_j$                     │
                                    └─────────────────────────────────┘
```

FIG. 4

MEASUREMENT OF BEAM REFINEMENT SIGNAL

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 depicts functionality of a user equipment (UE) operable to enhance the receiving performance of a reference signal for beam refinement in accordance with an example;

Figure 1A:
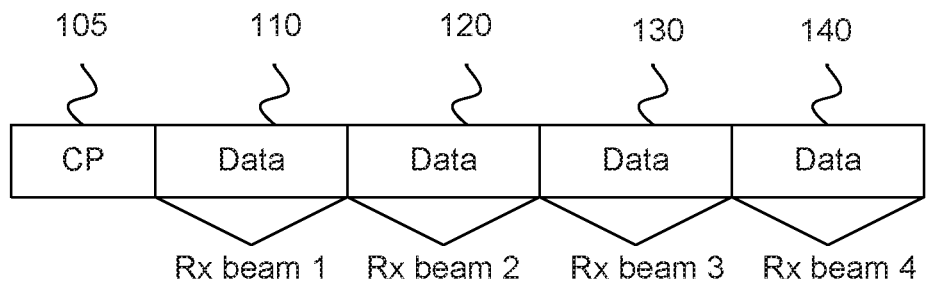
FIG. 1a illustrates a receiving beam sweeping structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In a massive multiple input multiple output (MIMO) system, the next generation node B (gNB) or new radio node B (gNB) and the UE can have a plurality of beams. Beam refinement is a useful way to determine the receiving beam with the highest power for a network. The beam refinement reference signal (BRRS) or beam management (BM) based channel state information reference signal (CSI-RS) (BM-CSI-RS) can create some data repetitions. In such a case, the user equipment (UE) can use different receiving beams to receive different data repetitions. The selected receiving beam can be the receiving beam in which the highest receiving power is observed. An interleaved frequency division multiple access (IFDMA) based scheme can be used to create a time domain repeater signal, where the number of repetitions can be equal to the value of a repetition factor (RPF).

In one example, different receiving beams can be applied to different repetitions of data and time domain correlation can be used. However, such a technique does not have good performance for low signal-to-interference plus noise ratio cases and large delay spread cases. Especially when the channel delay spread is large, it can be difficult to receive the BRRS or BM-CSI-RS with higher performance.

This problem can be addressed by modifying the receiving beam sweeping structure. Under the legacy operation, each receiving beam is associated with different data repetitions and no receiving beam is associated with the cyclic prefix. This results in inadequate performance. This inadequate performance can be ameliorated in one example by sampling the beam sweeping structure that comprises a CP and a plurality of data repetitions by associating a first receiving beam with at least a portion of the CP and at least a portion of a data repetition and associating the remaining data repetitions with at least a portion of two adjacent data repetitions. This change in receiving beam sweeping structure can produce better performance.

FIG. 1a illustrates an example of a receiving beam sweeping structure. In this example, in the time domain, the receiving signal for one antenna port can be given by: $y[n]=h[n]\otimes x[n]+\sigma[n]$, where $h[n]$ can be the equivalent beamformed channel from the serving new radio node B (gNB), $x[n]$ can be the downlink time domain signal, and $\sigma[n]$ can be the interference plus noise.

In this example, different receiving beams can be associated with different data as illustrated in FIG. 1a. The cyclic prefix (CP) 105 might not have a receiving beam associated with it according to this example. The first data repetition 110 can be associated with the first receiving beam. The second data repetition 120 can be associated with the second receiving beam. The third data repetition 130 can be associated with the third receiving beam. The fourth data repetition 140 can be associated with the fourth receiving beam. In this example, the repetition factor, which can be equal to the number of repetitions of data, is 4.

In the example of FIG. 1, the receiving signal for repetition j can be $y_j[n]$. The receiving beam with the highest receiving power can be selected by using:

$$g = \underset{j \in [1,4]}{\operatorname{argmax}} \left| \sum_{n=0}^{N-1} y_j[n](x[n])^* \right|^2,$$

where N can be the length of each data repetition and can be a positive real number and x[n] can be the time domain transmitting signal for one data repetition.

Figure 1B:
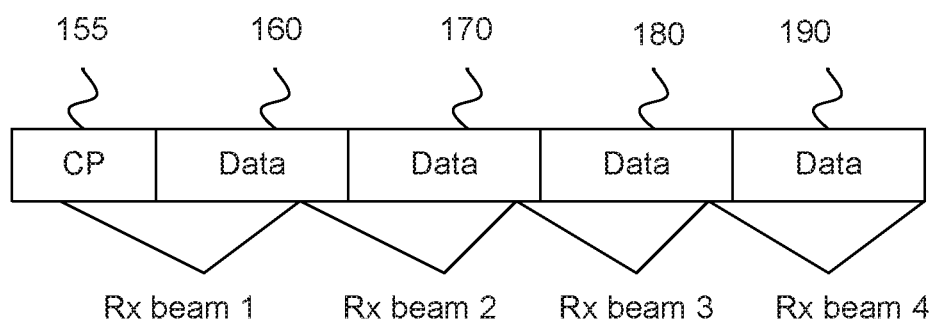
FIG. 1b illustrates a receiving beam sweeping structure in accordance with an example.

FIG. 1b illustrates another example of a receiving beam sweeping structure. For the interleaved frequency-division multiple access (IFDMA) structure, the tail part of each data repetition can be interpreted as the CP of the next data repetition.

The CP 155 can be associated in part with the first receiving beam. Part of the first data repetition 160 can also be associated with the first receiving beam. Part of the CP 155 may not be associated with the first receiving beam. Part of the first data repetition 160 can be associated with the second receiving beam. This portion of the first data repetition that is associated with the second receiving beam can be interpreted as the CP of the second data repetition. Part of the second data repetition 170 can also be associated with the second receiving beam. Part of the second data repetition 170 can also be associated with the third receiving beam. Part of the third data repetition 180 can also be associated with the third receiving beam. Part of the third data repetition 180 can be associated with the fourth receiving beam. The fourth data repetition 190 can be associated with the fourth receiving beam.

Each receiving beam can be applied to $N+\lceil N_{CP}/N_{RPF} \rceil$ samples, where N can be the length in number of samples of each data repetition and can be a positive real number, $N_{CP}$ can be the CP length and can be positive real number, and $N_{RPF}$ can be the number of data repetitions and can be a positive integer. For the receiving signal of one repetition, the first $\lceil N_{CP}/N_{RPF} \rceil$ samples can be viewed as the CP of one data repetition.

In another example, $y_j[n]$ can be the receiving signal after removal of the portion of the CP that might not be associated with a receiving beam. $x_j[n]$ can be the transmitting signal for the corresponding data repetition.

In another example, circular correlation can be used to determine the highest channel cluster using:

$$r_j = \max_{k \in [0,K]} \left| \sum_{n=0}^{N-1} y_j[n](x[n+k]_N)^* \right|^2,$$

where K can be selected by the receiver or determined by the normal CP length, such as K=128, and K can be a positive real number, and k can be a positive integer that is greater than or equal to 0 and less than or equal to K.

In this example, the receiving beam with the highest receiving power $r_j$ can be calculated using:

$$g = \underset{j \in [1, N_{RPF}]}{\operatorname{argmax}} r_j.$$

In another example, this operation can be optimized by using subsampling based circular correlation. In a first operation, an offset can be subsampled in the range [0,K]. Then the highest offset can be calculated using:

$$q_j = \underset{k \in \{T \times [0, \lfloor K/T \rfloor]\}}{\operatorname{argmax}} \left| \sum_{n=0}^{N-1} y_j[n](x[n+k]_N)^* \right|^2,$$

where T is a subsampling factor that is a positive integer, such as 8.

In this example, the highest power can be provided by:

$$r_j = \max_{k \in [q_j - \lceil \frac{T}{2} \rceil, q_j + \lceil \frac{T}{2} \rceil]} \left| \sum_{n=0}^{N-1} y_j[n](x[n+k]_N)^* \right|^2.$$

The receiving beam with the highest power can be provided by:

$$g = \underset{j \in [1, N_{RPF}]}{\operatorname{argmax}} r_j.$$

In another example, the time domain channel can be estimated by circular convolution by using: $\hat{h}_j[n] = \Sigma_{m=0}^{N-1} y_j[m] x[n-m]_N$, where m is a positive integer. In one example, the receiving power can be calculated using:

$$r_j = \max_{n \in [0, N-1]} |\hat{h}_j[n]|^2.$$

The receiving beam with the highest power can be provided by:

$$g = \underset{j \in [1, N_{RPF}]}{\operatorname{argmax}} r_j.$$

In another example, averaging can be used to suppress interference and noise by using:

$$q_j = \underset{n \in [0, N-1]}{\operatorname{argmax}} |\hat{h}_j[n]|^2$$

and $$r_j = \left| \frac{1}{\sqrt{2\Delta+1}} \sum_{n=q_j-\Delta}^{q_j+\Delta} \hat{h}_j[n] \right|^2,$$

where Δ can be selected according to channel state and can be an integer greater than 0. The receiving beam with the highest power can be provided by:

$$g = \underset{j \in [1, N_{RPF}]}{\mathrm{argmax}}\, r_j.$$

In another example, frequency receiving can be used. After removing the part of the CP with the length of $[N_{CP}/N_{RPF}]$, the frequency domain channel can be obtained based on a matched filter by: $H_j[k] = Y_j[k](X_j[k])^*$, where $Y_j[k]$ can be the frequency domain receiving signal after removal of the portion of the CP that might not be associated with a receiving beam and $X_j[k]$ can be the frequency domain transmitting signal at the corresponding data repetition of the receiving signal.

In another example, the receiving power can be calculated by:

$$r_j = \frac{1}{N} \sum_{q=0}^{\lfloor (N-1)/\Delta \rfloor} \left| \sum_{k=\Delta q}^{\Delta(q+1)} H_j[k] \right|^2.$$

The receiving beam with the highest power can be provided by:

$$g = \underset{j \in [1, N_{RPF}]}{\mathrm{argmax}}\, r_j.$$

In another example, the channel can be filtered to suppress the noise and interference by using a matched filter. $\tilde{h}_1(n)$ can be the time domain signal after the matched filter has been applied, which can be calculated by inverse fast Fourier transform (IFFT) or discrete cosine transform (DCT) of the $H_j[k]$.

Then some taps of $\tilde{h}_j(n)$, where there may be no channel response, can be set to be zero. In one example, only the taps within CP can be kept. In a fading channel, the time domain of the channel can be [x1, 0, 0, x2, x3, x4, 0, 0, . . . ], where there are two channel clusters {x1} and {x2, x3, x4}. Then the receiving power can be calculated based on the signal after filtering by using:

$$r_j = \frac{1}{N} \sum_{q=0}^{\lfloor \frac{N-1}{\Delta} \rfloor} \left| \sum_{k=\Delta q}^{\Delta(q+1)} H_j[k] \right|^2.$$

The receiving beam with the highest power can be provided by:

$$g = \underset{j \in [1, N_{RPF}]}{\mathrm{argmax}}\, r_j.$$

In another example, the interference can also be suppressed by user equipment (UE) beamforming. In this example, the received signal received quality (RSRQ) can be used to determine the receiving beam by using:

$$t_j = \frac{r_j}{\sum_{n=0}^{N-1} |y_j[n]|^2 - r_j}.$$

The receiving beam with the highest power can be provided by:

$$g = \underset{j \in [1, N_{RPF}]}{\mathrm{argmax}}\, r_j.$$

In another example, multiple receiving antenna ports and transmitting antenna ports can be used. In this example, the receiving power can be calculated by $$r_j = \frac{1}{MQ} \sum_{m=0}^{M-1} \sum_{n=0}^{Q-1} r_j^{(m,q)},$$

where $r_j^{(m,q)}$ can be the linear receiving power between receiving antenna port m and transmitting antenna port q, M can be the number of receiving antenna ports, and Q can be the number of transmitting antenna ports, and all four of m, q, M, Q can be positive integers. In one example, for 2-port CSI-RS, the Layer 1 Reference Signal Receiving Power (L1-RSRP) to be reported is calculated based on the averaging of the linear L1-RSRP for each antenna port. If a UE is configured with the higher layer parameter NrofPorts set to 'two,' then the UE can compute a linear average of each CSI-RS port's RSRP.

In another example, the receiving power can be calculated based on the maximum receiving power from one antenna port by using:

$$r_j = \max_{q \in [0, Q-1]} \frac{1}{M} \sum_{m=0}^{M-1} r_j^{(m,q)}.$$

In another example, the receiving power can be calculated based on the minimum receiving power from one antenna port by using:

$$r_j = \min_{q \in [0, Q-1]} \frac{1}{M} \sum_{m=0}^{M-1} r_j^{(m,q)}.$$

Figure 2:
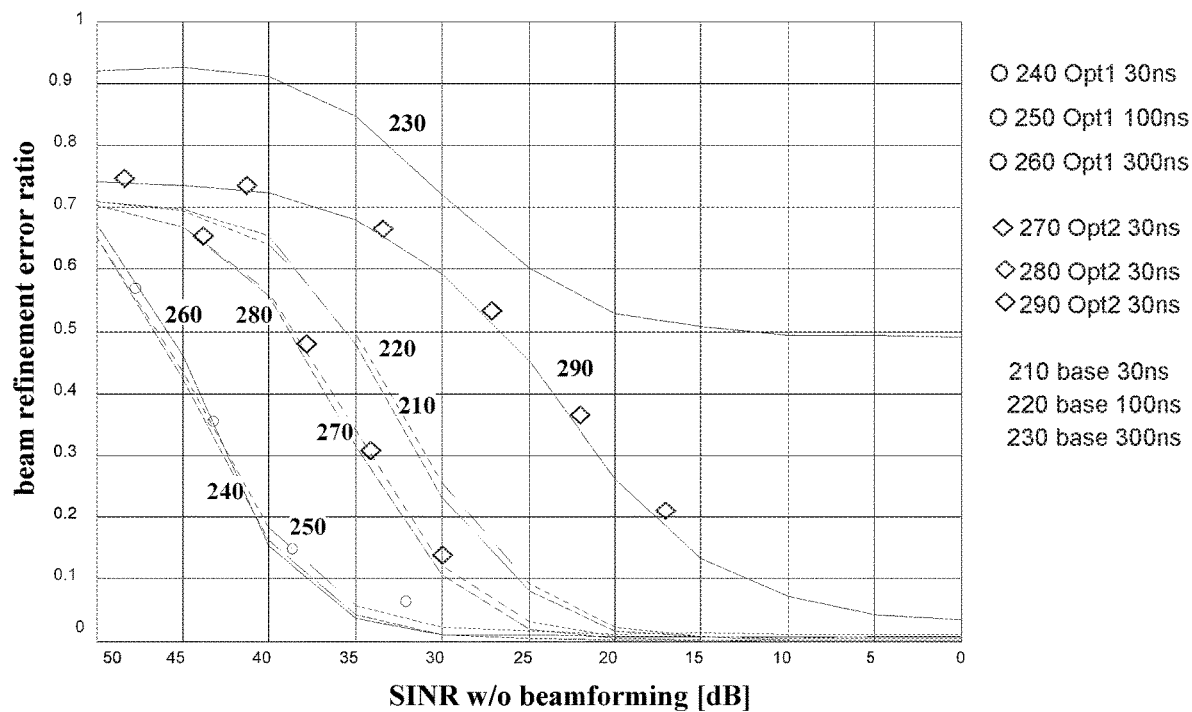
FIG. 2 illustrates link level simulation results in accordance with an example.

FIG. 2 illustrates an example of the beam refinement error ratio as a function of the signal-to-interference plus noise ratio (SINR) with beamforming in decibels (dB). These link layer simulation results used a CDL-A model for a gNB antenna (4, 8, 1, 1) and a UE antenna (2,4,1,1). In 3GPP Technical Report (TR) 38.900 Version 14, the antenna structure can be defined as (M, N, P, Q), where M can indicate the number of rows in a 2D antenna panel, N can be the number of columns in a 2D antenna panel, P can be the number of antenna polarization, and Q can be the number of RF chains. The base case can use the beam sweeping structure from FIG. 1a. The base line 210 shows the results for a 30 nanosecond (ns) delay spread. The base line 220 shows the results for a 100 ns delay spread. The base line 230 shows the results for a 300 ns delay spread. The base line 210 and base line 220 substantially overlap with each other. The base line 230 has a higher beam refinement error ratio than the lines 210, 220 for all SINR levels because the base line 230 has a higher delay spread than the lines 210, 220. This can show decreased performance for the base case in comparison when higher delay spreads are used. The line 230 also has a higher beam refinement error ratio for lower SINR cases in comparison to lines 210 and 220.

In one example, time domain circular correlation, shown in FIG. 2 as opt1, can be shown in link layer simulation results. The time domain circular correlation case can use the beam sweeping structure from FIG. 1b. Lines 240, 250, and 260 are substantially co-located for varying SINR levels. This indicates that the delay spread might not have as much of an effect on the beam refinement error ratio for the case of time domain circular correlation. All three lines 240, 250, and 260 also have a lower beam refinement error ratio for lower SINR cases in comparison to line 230 of the base case.

In one example, frequency domain receiving, as shown in FIG. 2 as opt2, can be shown in link layer simulation results. The frequency domain receiving case can use the beam sweeping structure from FIG. 1b. Line 290, with a delay spread of 300 ns, has a higher beam refinement error ratio at all SINR levels in comparison with lines 270 and 280. This indicates that the delay spread can have an effect on the beam refinement error ratio for the case of frequency domain receiving. The two lines 270 and 280 converge toward a beam refinement error ratio of 0. The line 290 converges more slowly than the lines 270 and 280.

Figure 3:
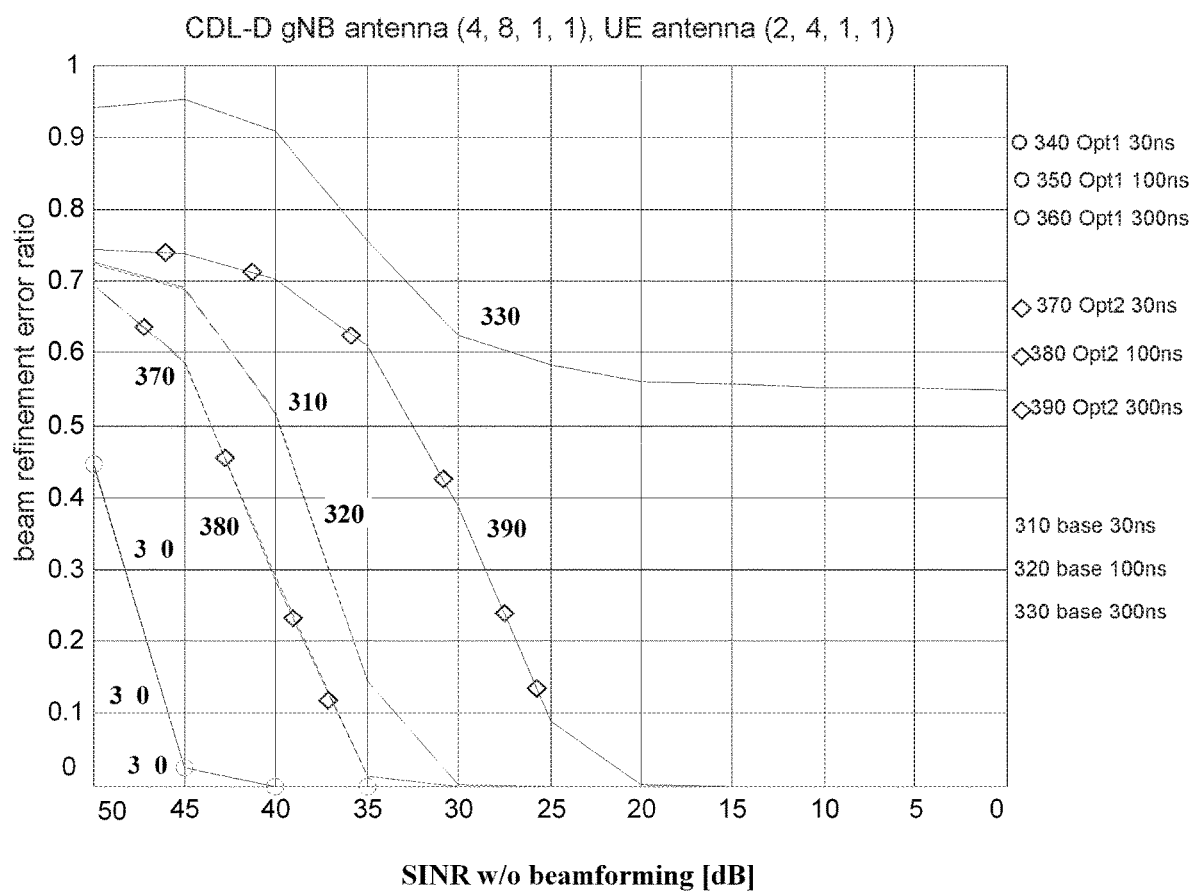
FIG. 3 illustrates link level simulation results in accordance with an example.

FIG. 3 illustrates an example of the beam refinement error ratio as a function of the signal-to-interference plus noise ratio (SINR) without beamforming in decibels (dB). These link layer simulation results used a CDL-D model for a gNB antenna (4, 8, 1, 1) and a UE antenna (2,4,1,1). In 3GPP Technical Report (TR) 38.900 Version 14, the antenna structure can be defined as (M, N, P, Q), where M can indicate the number of rows in a 2D antenna panel, N can be the number of columns in a 2D antenna panel, P can be the number of antenna polarization, and Q can be the number of RF chains. The base case can use the beam sweeping structure from FIG. 1a. The base line 310 shows the results for a 30 nanosecond (ns) delay spread. The base line 320 shows the results for a 100 ns delay spread. The base line 330 shows the results for a 300 ns delay spread. The base line 310 and base line 320 substantially overlap with each other. The base line 330 has a higher beam refinement error ratio than the lines 310, 320 for all SINR levels because the base line 330 has a higher delay spread than the lines 310, 320. This can show decreased performance for the base case in comparison when higher delay spreads are used. The line 330 also has a higher beam refinement error ratio for lower SINR cases in comparison to lines 310 and 320.

In one example, time domain circular correlation, shown in FIG. 3 as opt1, can be shown in link layer simulation results. The time domain circular correlation case can use the beam sweeping structure from FIG. 1b. Lines 340, 350, and 360 are substantially co-located for varying SINR levels. This indicates that the delay spread might not have as much of an effect on the beam refinement error ratio for the case of time domain circular correlation. All three lines 340, 350, and 360 also have a lower beam refinement error ratio for lower SINR cases in comparison to line 330 of the base case.

In one example, frequency domain receiving, as shown in FIG. 3 as opt2, can be shown in link layer simulation results. The frequency domain receiving case can use the beam sweeping structure from FIG. 1b. Line 390, with a delay spread of 300 ns, has a higher beam refinement error ratio at all SINR levels in comparison with lines 370 and 380. This indicates that the delay spread can have an effect on the beam refinement error ratio for the case of frequency domain receiving. The two lines 370 and 380 converge toward a beam refinement error ratio of 0. The line 390 converges more slowly than the lines 270 and 280.

These results show that time domain circular correlation and frequency domain receiving both perform better than the base line case for varying SINR levels. Time domain circular correlation can perform better than the base line case regardless of the delay spread. Frequency domain receiving can perform better than the base line case when the delay spread is the same. Overall, these link layer simulation results in FIGS. 2 and 3 show that time domain circular correlation and frequency domain receiving can perform better with higher delay spreads and in lower SINR levels.

Another example provides functionality 400 of a UE operable to enhance the receiving performance of a reference signal for beam refinement, as shown in FIG. 4. The UE can comprise one or more processors. The one or more processors can be configured to determine a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions, as in block 410. The one or more processors can be configured to calculate the receiving power $r_j$ for each of the plurality of receiving beams, wherein r is a real number and j is a set of integers greater than or equal to 1 and less than or equal to $N_{RPF}$, as in block 420. The one or more processors can be configured to select a refined receiving beam having a highest receiving power $r_j$, as in block 430. In addition, the UE can comprise a memory interface configured to send the refined receiving beam having the highest power to a memory.

Figure 5:
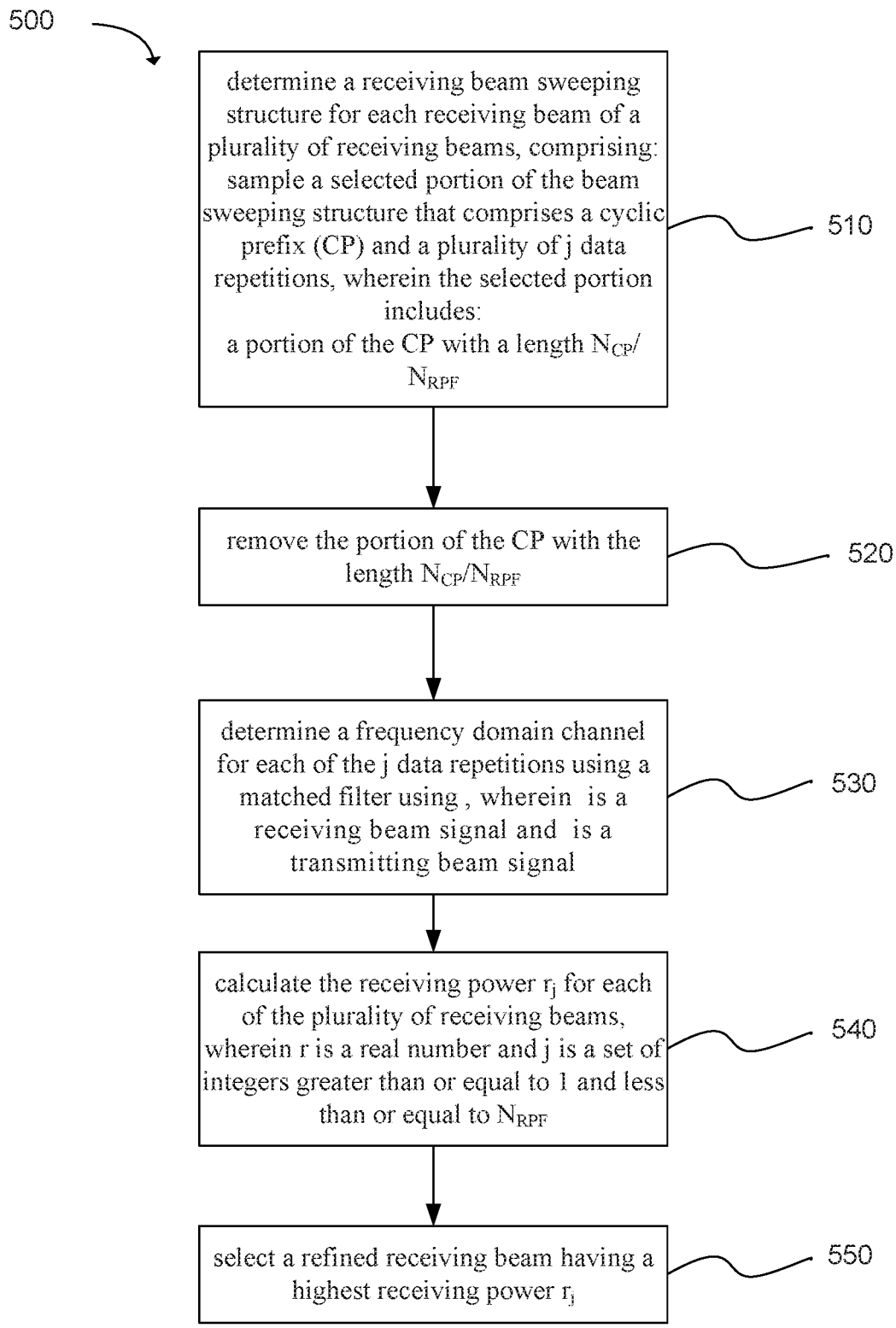
FIG. 5 depicts functionality of a UE operable to enhance the receiving performance of a reference signal for beam refinement in accordance with an example.

Another example provides functionality 500 of a UE operable to enhance the receiving performance of a reference signal for beam refinement, as shown in FIG. 5. The UE can comprise one or more processors. The one or more processors can be configured to determine a receiving beam sweeping structure for each receiving beam of a plurality of receiving beams, comprising: sample a selected portion of the beam sweeping structure that comprises a cyclic prefix (CP) and a plurality of j data repetitions, wherein the selected portion includes: a portion of the CP with a length $N_{CP}/N_{RPF}$, as in block 510. The one or more processors can be configured to remove the portion of the CP with the length $N_{CP}/N_{RPF}$, as in block 520. The one or more processors can be configured to determine a frequency domain channel for each of the j data repetitions using a matched filter using $H_j[k]=Y_j[k] (X_j[k])^*$, wherein $Y_j[k]$ is a receiving beam signal and $X_j[k]$ is a transmitting beam signal, as in block 530. The one or more processors can be configured to calculate the receiving power $r_j$ for each of the plurality of receiving beams, wherein r is a real number and j is a set of integers greater than or equal to 1 and less than or equal to $N_{RPF}$, as in block 540. The one or more processors can be configured to select a refined receiving beam having a highest receiving power $r_j$, as in block 550. In addition, the UE can comprise a memory interface configured to send the refined receiving beam having the highest power to a memory.

Figure 6:
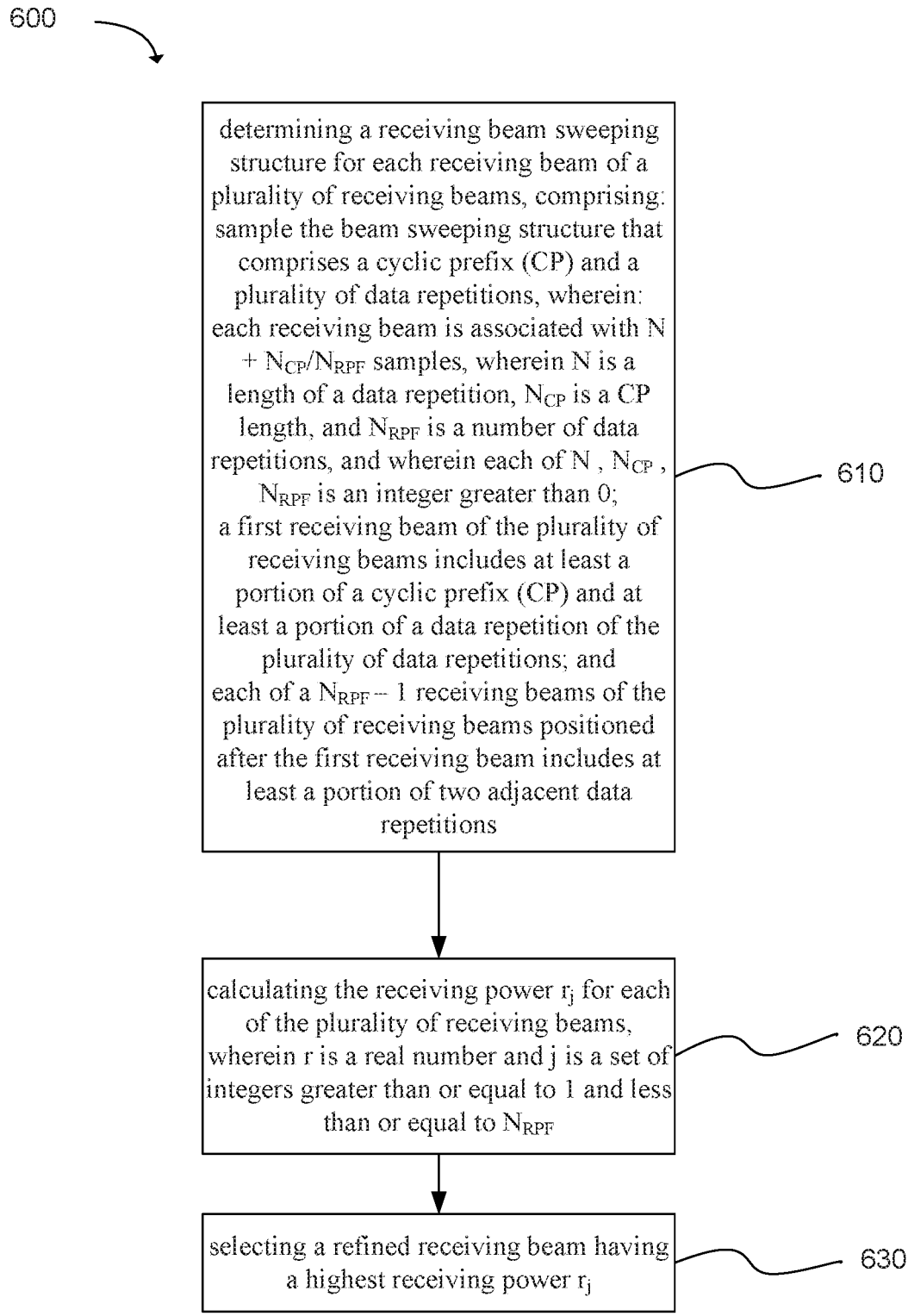
FIG. 6 depicts a flowchart of a machine readable storage medium having instructions embodied thereon for enhancing the receiving performance of a reference signal for beam refinement in accordance with an example.

Another example provides at least one machine readable storage medium having instructions 600 embodied thereon for enhancing the receiving performance of a reference signal for beam refinement, as shown in FIG. 6. The instructions can be executed on a machine, where the instructions are included on at least one computer readable medium or one non-transitory machine readable storage medium. The instructions when executed perform: determining a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions, as in block 610. The instructions when executed perform: calculating the receiving power $r_j$ for each of the plurality of receiving beams, wherein r is a real number and j is a set of integers greater than or equal to 1 and less than or equal to $N_{RPF}$, as in block 620. The instructions when executed perform: selecting a refined receiving beam having a highest receiving power $r_j$, as in block 630.

While examples have been provided in which an eNodeB has been specified, they are not intended to be limiting. A fifth generation gNB can be used in place of the eNodeB. Accordingly, unless otherwise stated, any example herein in which an eNodeB has been disclosed, can similarly be disclosed with the use of a gNB (Next Generation node B).

Figure 7:
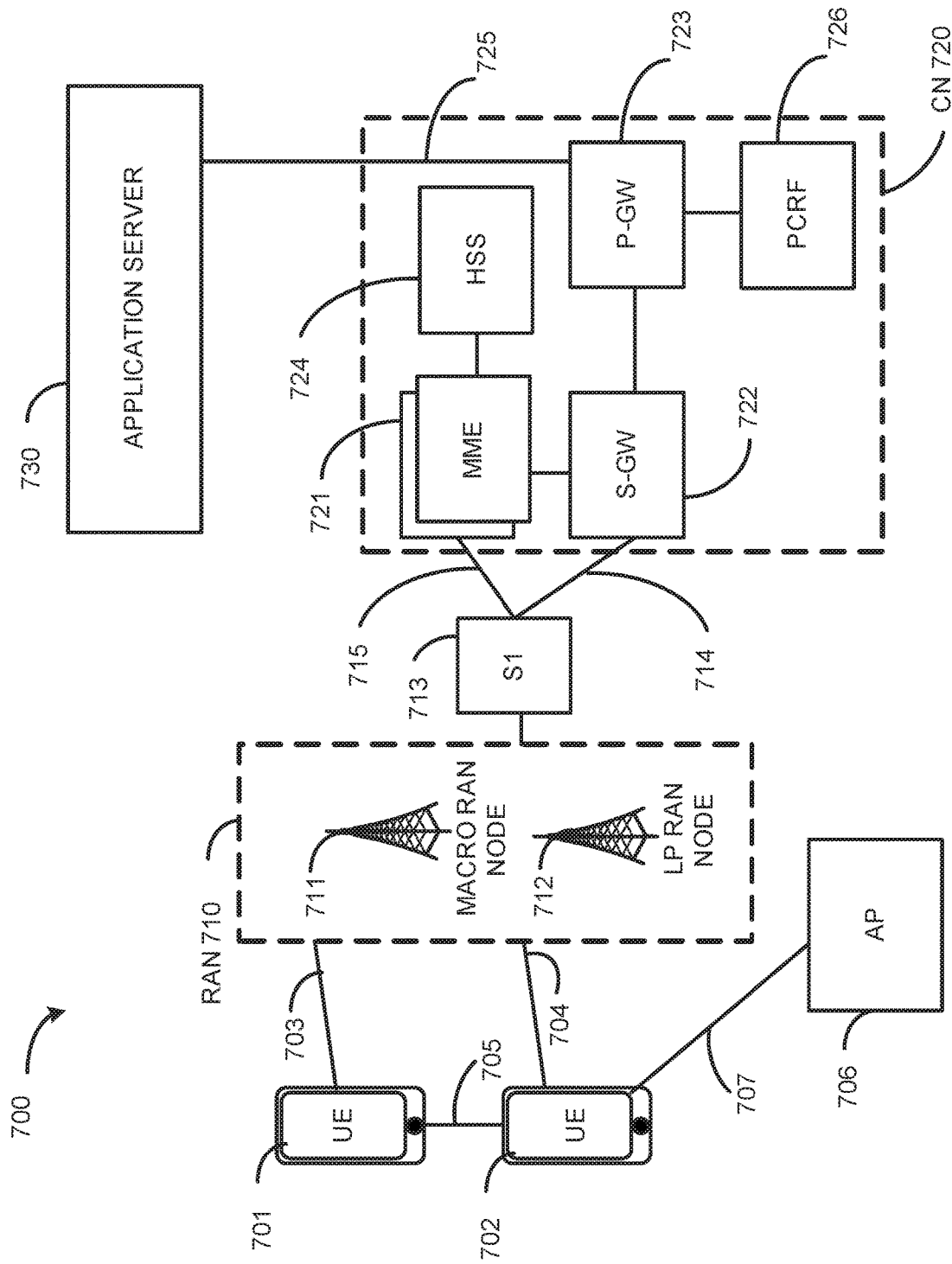
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate a SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
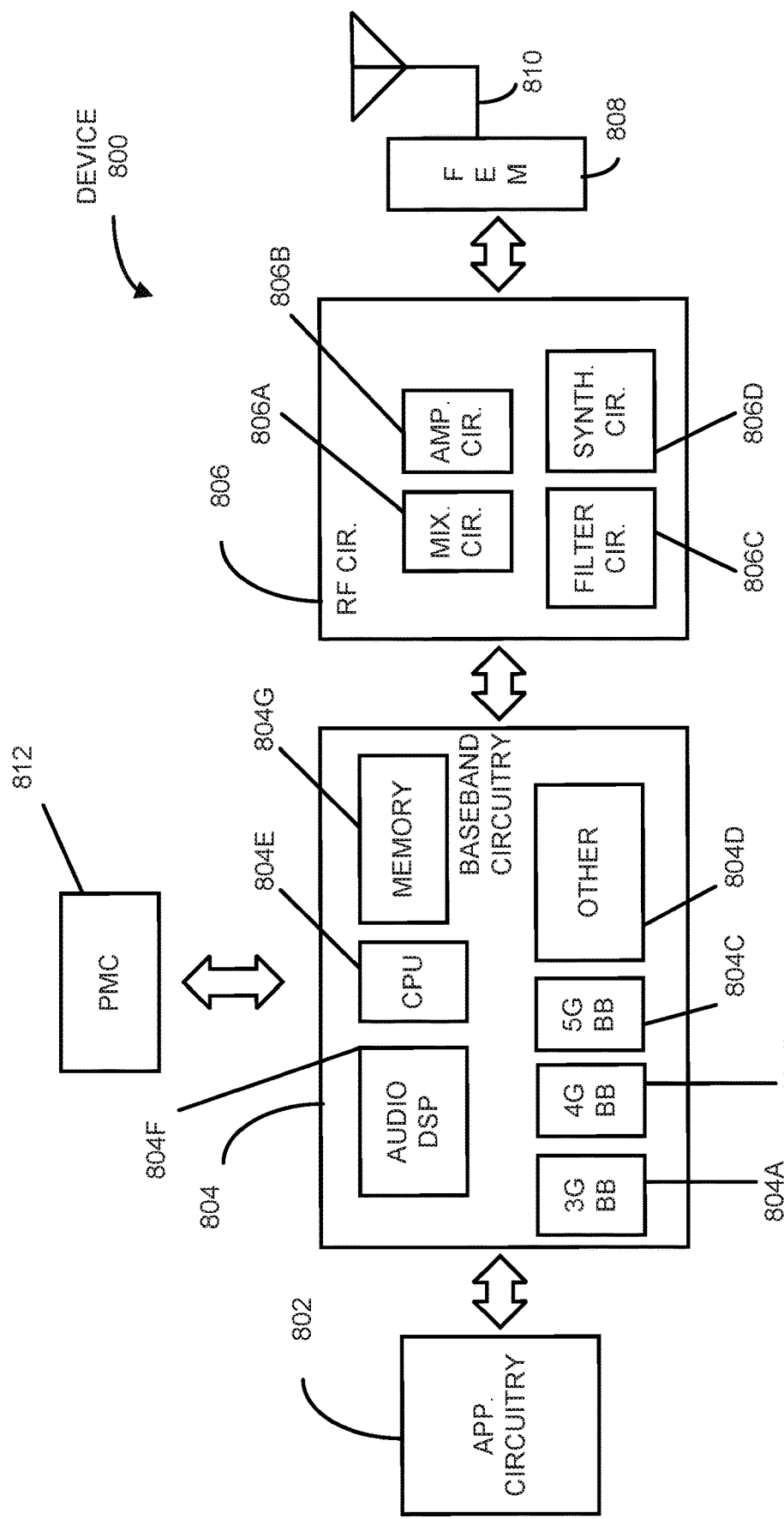
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804a, a fourth generation (4G) baseband processor 804b, a fifth generation (5G) baseband processor 804c, or other baseband processor(s) 804d for other existing generations, generations in development or to be developed in the future (e.g., second generation (2G), sixth generation (6G), etc.). The baseband circuitry 804 (e.g., one or more of baseband processors 804a-d) may handle various radio control functions that enable communication with one or more radio networks via the RF circuitry 806. In other embodiments, some or all of the functionality of baseband processors 804a-d may be included in modules stored in the memory 804g and executed via a Central Processing Unit (CPU) 804e. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
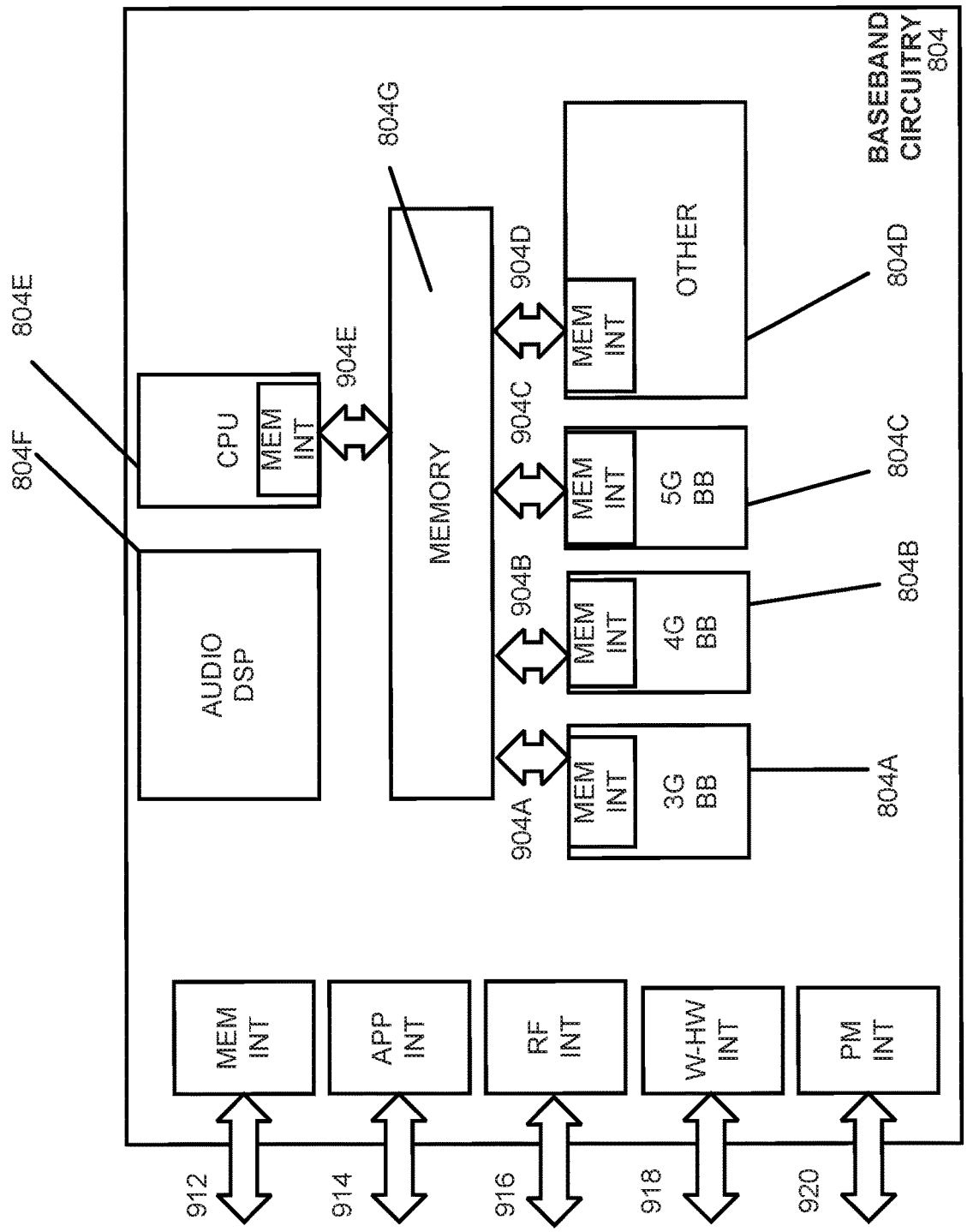
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
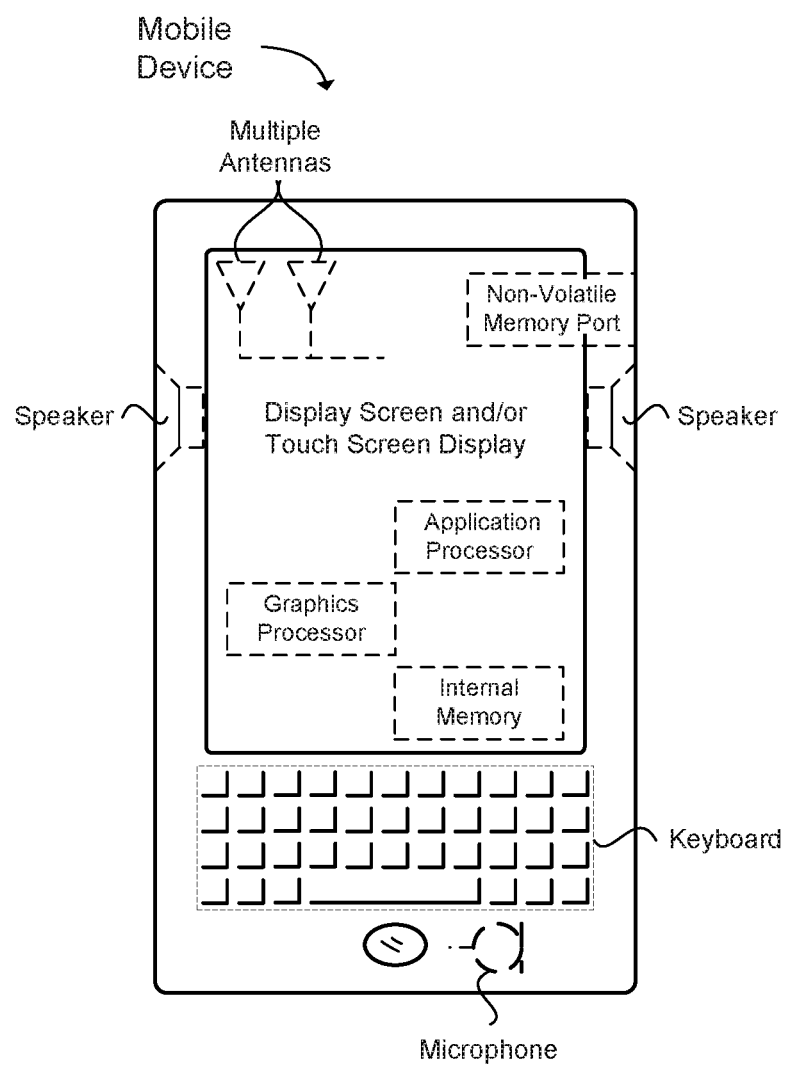
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE) operable to enhance the receiving performance of a reference signal for beam refinement, the apparatus comprising: one or more processors configured to: determine a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions; calculate the receiving power $r_j$ for each of the plurality of receiving beams, wherein r is a real number and j is a set of integers greater than or equal to 1 and less than or equal to $N_{RPF}$; and select a refined receiving beam having a highest receiving power $r_j$; and a memory interface configured to send the refined receiving beam having the highest power to a memory.

Example 2 includes the apparatus of Example 1, wherein the one or more processors are further configured to: calculate the receiving power $r_j$ for each of the plurality of receiving beams by circular correlation using:

$$r_j = \max_{k \in [0,K]} \left| \sum_{n=0}^{N-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

Example 3 includes the apparatus of Example 2, wherein the one or more processors are further configured to: determine an offset in a range from 0 to K by subsampling; calculate a highest offset by using:

$$q_j = \operatorname*{argmax}_{k \in [T \times [0, \lfloor K/T \rfloor]]} \left| \sum_{n=0}^{N-1} y_j[n](x[n+k]_N)^* \right|^2,$$

wherein T is a subsampling factor and a positive integer; and calculate the receiving power for each of the plurality of receiving beams using:

$$r_j = \max_{k \in [q_j - \lceil T/2 \rceil, q_j + \lceil T/2 \rceil]} \left| \sum_{n=0}^{N-1} y_j[n](x[n+k]_N)^* \right|^2.$$

Example 4 includes the apparatus of Example 1, wherein the one or more processors are further configured to: calculate a time domain channel by circular convolution using: $\hat{h}_1[n] = \sum_{m=0}^{N-1} y_j[m] \times [n\ m]_N$, wherein $y_j[m]$ is a receiving beam of j and $x_j[m]$ is a transmitting beam of j; and calculate the receiving power $r_j$ for each of the plurality of receiving beams using:

$$r_j = \max_{n \in [0, N-1]} |\hat{h}_j[n]|^2.$$

Example 5 includes the apparatus of Example 4, wherein the one or more processors are further configured to: calculate a second highest receiving power, $q_j$, using:

$$q_j = \operatorname*{argmax}_{n \in [0, N-1]} |\hat{h}_j[n]|^2;$$

and calculate an average highest receiving power $r_j$ using $$r_j = \left| \frac{1}{\sqrt{2\Delta+1}} \sum_{n=q_j-\Delta}^{q_j+\Delta} \hat{h}_j[n] \right|^2,$$

wherein $\Delta$ is a positive integer.

Example 6 includes the apparatus of Example 1, wherein the one or more processors are further configured to: determine a quality $t_j$ for each of the plurality of receiving beams by using: $t_j = r_j / (\sum_{n=0}^{N-1} |y_j[n]|^2 - r_j)$, wherein $y_j[n]$ is a receiving beam of j; and select a receiving beam having a highest quality Q using $$Q = \operatorname*{argmax}_{j \in [1, N_{RPF}]} r_j.$$

Example 7 includes the apparatus of Example 1, wherein the one or more processors are further configured to: calculate the highest receiving power using $$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 8 includes the apparatus of Example 1, wherein the one or more processors are further configured to: calculate the highest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 9 includes the apparatus of Example 1, wherein the one or more processors are further configured to: calculate a lowest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ port using: is the receiving power between a receiving antenna port m and a transmitting antenna port q, M is the number of receiving antenna ports, and Q is the number of transmitting antenna ports, and wherein m, q, M, and Q are all positive integers.

Example 10 includes an apparatus of a user equipment (UE) operable to enhance the receiving performance of a reference signal for beam refinement, the apparatus comprising: one or more processors configured to: determine a receiving beam sweeping structure for each receiving beam of a plurality of receiving beams, comprising: sample a selected portion of the beam sweeping structure that comprises a cyclic prefix (CP) and a plurality of j data repetitions, wherein the selected portion includes: a portion of the CP with a length $N_{CP}/N_{RPF}$; remove the portion of the CP with the length $N_{CP}/N_{RPF}$; determine a frequency domain channel for each of the j data repetitions using a matched filter using $H_j[k] = Y_j[k](X_j[k])^*$, wherein $Y_j[k]$ is a receiving beam signal and $X_j[k]$ is a transmitting beam signal; calculate the receiving power $r_j$ for each of the plurality of receiving beams, wherein r is a real number and j is a set of integers greater than or equal to 1 and less than or equal to $N_{RPF}$; and select a refined receiving beam having a highest receiving power $r_j$; and a memory interface configured to send the refined receiving beam having the highest power to a memory.

Example 11 includes the apparatus of Example 10, wherein the one or more processors are further configured to: calculate the receiving power $r_j$ of each of the plurality of receiving beams using:

$$r_j = \frac{1}{N} \sum_{q=0}^{\lfloor (N-1)/\Delta \rfloor} \left| \sum_{k=\Delta q}^{\Delta(q+1)} H_j[k] \right|^2,$$

wherein N is a length of a data repetition and is a real number, and wherein $\Delta$ is a positive integer.

Example 12 includes the apparatus of Example 10, wherein the one or more processors are further configured to: calculate the receiving power based on the signal after filtering.

Example 13 includes the apparatus of Example 10, wherein the one or more processors are further configured to: determine a quality $t_j$ for each of the plurality of receiving beams by using: $t_j = r_j/(\Sigma_{n=0}^{N-1} |y_j[n]|^2 - r_j)$, wherein $y_j[n]$ is a receiving beam of j; and select a receiving beam having a highest quality Q using $$Q = \underset{j \in [1, N_{RPF}]}{\operatorname{argmax}} r_j.$$

Example 14 includes the apparatus of Example 10, wherein the one or more processors are further configured to: calculate the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 15 includes the apparatus of Example 10, wherein the one or more processors are further configured to: calculate a lowest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 16 includes at least one machine readable storage medium having instructions embodied thereon for enhancing the receiving performance of a reference signal for beam refinement, the instructions when executed by one or more processors at a user equipment (UE) perform the following: determining a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions; calculating the receiving power $r_j$ for each of the plurality of receiving beams, wherein r is a real number and j is a set of integers greater than or equal to 1 and less than or equal to $N_{RPF}$; and selecting a refined receiving beam having a highest receiving power $r_j$.

Example 17 includes the at least one machine readable storage medium of Example 16, further comprising instructions that when executed perform: calculating the receiving power $r_j$ for each of the plurality of receiving beams by circular correlation using:

$$r_j = \max_{k \in [0,K]} \left| \sum_{n=0}^{N-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

Example 18 includes the at least one machine readable storage medium of Example 17, further comprising instructions that when executed perform: determining an offset in a range from 0 to K by subsampling; calculating a highest offset by using $$q_j = \max_{k \in [T \times [0, \lfloor K/T \rfloor]]} \left| \sum_{n=0}^{N-1} y_j[n](x[n+k]_N)^* \right|^2,$$

wherein T is a subsampling factor and a positive integer; and calculating the receiving power for each of the plurality of receiving beams using:

$$r_j = \max_{k \in [q_j - \lceil T/2 \rceil, q_j + \lceil T/2 \rceil]} \left| \sum_{n=0}^{N-1} y_j[n](x[n+k]_N)^* \right|^2.$$

Example 19 includes the at least one machine readable storage medium of Example 16, further comprising instructions that when executed perform: calculating a time domain channel by circular convolution using: $\hat{h}_j[n] = \Sigma_{m=0}^{N-1} y_j[m] \times [n-m]_N$, wherein $y_j[m]$ is a receiving beam of j and $x_j[m]$ is a transmitting beam of j; and calculating the receiving power $r_j$ for each of the plurality of receiving beams using:

$$r_j = \max_{n \in [0, N-1]} |\hat{h}_j[n]|^2.$$

Example 20 includes the at least one machine readable storage medium of Example 19, further comprising instructions that when executed perform: calculating a second highest receiving power, $q_j$, using:

$$q_j = \underset{n \in [0,N-1]}{\operatorname{argmax}} |\hat{h}_j[n]|^2;$$

and calculating an average highest receiving power $r_j$ using:

$$r_j = \left| \frac{1}{\sqrt{2\Delta+1}} \sum_{n=q_j-\Delta}^{q_j+\Delta} \hat{h}_j[n] \right|^2,$$

wherein $\Delta$ is a positive integer.

Example 21 includes the at least one machine readable storage medium of Example 16, further comprising instructions that when executed perform: determining a quality $t_j$ for each of the plurality of receiving beams by using: $t_j = r_j/(\sum_{n=0}^{N-1} |y_j[n]|^2 - r_j)$, wherein $y_j[n]$ is a receiving beam of j; and selecting a receiving beam having a highest quality Q using $$Q = \underset{j \in [1, N_{RPF}]}{\operatorname{argmax}} r_j.$$

Example 22 includes the at least one machine readable storage medium of Example 16, further comprising instructions that when executed perform: calculating the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 23 includes the at least one machine readable storage medium of Example 16, further comprising instructions that when executed perform: calculating the highest receiving power from one antenna port using:

$$r_j = \max_{q \in [0,Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 24 includes the at least one machine readable storage medium of Example 16, further comprising instructions that when executed perform: calculating a lowest receiving power from one antenna port using:

$$r_j = \max_{q \in [0,Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 25 includes A user equipment (UE) operable for enhancing the receiving performance of a reference signal for beam refinement, the UE comprising: means for determining a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions; means for calculating the receiving power $r_j$ for each of the plurality of receiving beams, wherein r is a real number and j is a set of integers greater than or equal to 1 and less than or equal to $N_{RPF}$; and means for selecting a refined receiving beam having a highest receiving power $r_j$.

Example 26 includes the UE of Example 25, the UE further comprising: means for calculating the receiving power $r_j$ for each of the plurality of receiving beams by circular correlation using:

$$r_j = \max_{k \in [0,K]} \left| \sum_{n=0}^{N-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

Example 27 includes the UE of Example 26, the UE further comprising: means for determining an offset in a range from 0 to K by subsampling; means for calculating a highest offset by using:

$$q_j = \underset{k \in \{T \times [0, \lfloor K/T \rfloor]\}}{\operatorname{argmax}} \left| \sum_{n=0}^{N-1} y_j[n](x[n+k]_N)^* \right|^2,$$

wherein T is a subsampling factor and a positive integer; and means for calculating the receiving power for each of the plurality of receiving beams using:

$$r_j = \max_{k \in [q_j - \lceil T/2 \rceil, q_j + \lceil T/2 \rceil]} \left| \sum_{n=0}^{N-1} y_j[n](x[n+k]_N)^* \right|^2.$$

Example 28 includes the UE of Example 25, the UE further comprising: means for calculating a time domain channel by circular convolution using: $\hat{h}_j[n]=\sum_{m=0}^{N-1} y_j[m] \times [n-m]_N$, wherein $y_j[m]$ is a receiving beam of j and $x_j[m]$ is a transmitting beam of j; and means for calculating the receiving power $r_j$ for each of the plurality of receiving beams using:

$$r_j = \max_{n \in [0,N-1]} |\hat{h}_j[n]|^2.$$

Example 29 includes the UE of Example 28, the UE further comprising: means for calculating a second highest receiving power, $q_j$, using:

$$q_j = \operatorname*{argmax}_{n \in [0,N-1]} |\hat{h}_j[n]|^2;$$

and means for calculating an average highest receiving power $r_j$ using:

$$r_j = \left| \frac{1}{\sqrt{2\Delta+1}} \sum_{n=q_j-\Delta}^{q_j+\Delta} \hat{h}_j[n] \right|^2,$$

wherein $\Delta$ is a positive integer.

Example 30 includes the the UE of Example 25, the UE further comprising: means for determining a quality $t_j$ for each of the plurality of receiving beams by using: $t_j=r_j/(\sum_{n=0}^{N-1}|y_j[n]|^2-r_j)$, wherein $y_j[n]$ is a receiving beam of j; and means for selecting a receiving beam having a highest quality Q using $$Q = \operatorname*{argmax}_{j \in [1,N_{RPF}]} r_j.$$

Example 31 includes the UE of Example 25, the UE further comprising: means for calculating the highest receiving power using:

$$r_j = \frac{1}{M} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 32 includes the UE of Example 25, the UE further comprising: means for calculating the highest receiving power from one antenna port using $$r_j = \max_{q \in [0,Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 33 includes the UE of Example 25, the UE further comprising: means for calculating a lowest receiving power from one antenna port using:

$$r_j = \min_{q \in [0,Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 34 includes an apparatus of a user equipment (UE) operable to enhance the receiving performance of a reference signal for beam refinement, the apparatus comprising: one or more processors configured to: determine a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions; calculate the receiving power $r_j$ for each of the plurality of receiving beams, wherein r is a real number and j is a set of integers greater than or equal to 1 and less than or equal to $N_{RPF}$; and select a refined receiving beam having a highest receiving power $r_j$; and a memory interface configured to send the refined receiving beam having the highest power to a memory.

Example 35 includes the apparatus of Example 34, wherein the one or more processors are further configured to: calculate the receiving power $r_j$ for each of the plurality of receiving beams by circular correlation using:

$$r_j = \max_{k \in [0,K]} \left| \sum_{n=0}^{N-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

Example 36 includes the apparatus of Example 35, wherein the one or more processors are further configured to: determine an offset in a range from 0 to K by subsampling; calculate a highest offset by using:

$$q_j = \operatorname*{argmax}_{k \in \{T \times [0, \lfloor K/T \rfloor]\}} \left| \sum_{n=0}^{N-1} y_j[n](x[n+k]_N)^* \right|^2,$$

wherein T is a subsampling factor and a positive integer; and calculate the receiving power for each of the plurality of receiving beams using:

$$r_j = \max_{k \in [q_j - \lceil T/2 \rceil, q_j + \lceil T/2 \rceil]} \left| \sum_{n=0}^{N-1} y_j[n](x[n+k]_N)^* \right|^2.$$

Example 37 includes the apparatus of Example 34, wherein the one or more processors are further configured to: calculate a time domain channel by circular convolution using: $\hat{h}_j[n] = \Sigma_{m=0}^{N-1} y_j[n]|^2 [m] \times [n \, m]_N$, wherein $y_j[m]$ is a receiving beam of j and $x_j[m]$ is a transmitting beam of j; and calculate the receiving power $r_j$ for each of the plurality of receiving beams using:

$$r_j = \max_{n \in [0, N-1]} |\hat{h}_j[n]|^2.$$

Example 38 includes the apparatus of Example 37, wherein the one or more processors are further configured to: calculate a second highest receiving power, $q_j$, using:

$$q_j = \underset{n \in [0, N-1]}{\operatorname{argmax}} |\hat{h}_j[n]|^2;$$

calculate an average highest receiving power $r_j$ using $$r_j = \left| \frac{1}{\sqrt{2\Delta + 1}} \sum_{n=q_j - \Delta}^{q_j + \Delta} \hat{h}_j[n] \right|^2,$$

wherein $\Delta$ is a positive integer; determine a quality $t_j$ for each of the plurality of receiving beams by using: $t_j = r_j / (\Sigma_{m=0}^{N-1} |y_j[n]|^2 [n]|^2 - r_j)$, wherein $x_j[n]$ is a receiving beam of j; and select a receiving beam having a highest quality Q using $$Q = \underset{j \in [1, N_{RPF}]}{\operatorname{argmax}} r_j.$$

Example 39 includes the apparatus of Example 34, wherein the one or more processors are further configured to: calculate the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers; calculate the highest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers; or calculate a lowest receiving power from one antenna port using:

$$r_j = \min_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 40 includes an apparatus of a user equipment (UE) operable to enhance the receiving performance of a reference signal for beam refinement, the apparatus comprising: one or more processors configured to: determine a receiving beam sweeping structure for each receiving beam of a plurality of receiving beams, comprising: sample a selected portion of the beam sweeping structure that comprises a cyclic prefix (CP) and a plurality of j data repetitions, wherein the selected portion includes: a portion of the CP with a length $N_{CP}/N_{RPF}$; remove the portion of the CP with the length $N_{CP}/N_{RPF}$; determine a frequency domain channel for each of the j data repetitions using a matched filter using $H_j[k] = Y_j[k](X_j[k])^*$, wherein $Y_j[k]$ is a receiving beam signal and $X_j[k]$ is a transmitting beam signal; calculate the receiving power $r_j$ for each of the plurality of receiving beams, wherein r is a real number and j is a set of integers greater than or equal to 1 and less than or equal to $N_{RPF}$; and select a refined receiving beam having a highest receiving power $r_j$; and a memory interface configured to send the refined receiving beam having the highest power to a memory.

Example 41 includes the apparatus of Example 40, wherein the one or more processors are further configured to: calculate the receiving power $r_j$ of each of the plurality of receiving beams using:

$$\left\{ r_j = \frac{1}{N} \sum_{q=0}^{\lfloor (N-1)/\Delta \rfloor} \left| \sum_{k=\Delta q}^{\Delta(q+1)} H_j[k] \right|^2 \right.,$$

wherein N is a length of a data repetition and is a real number, and wherein $\Delta$ is a positive integer; calculate the receiving power based on the signal after filtering; calculate the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers; or calculate a lowest receiving power from one antenna port using:

$$r_j = \min_{q \in [0,Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Example 42 includes the apparatus of Example 40, wherein the one or more processors are further configured to: determine a quality $t_j$ for each of the plurality of receiving beams by using: $t_j = r_j/(\Sigma_{n=0}^{N-1}|y_j[n]|^2 - r_j)$, wherein $y_j[n]$ is a receiving beam of j; and select a receiving beam having a highest quality Q using $$Q = \operatorname*{argmax}_{j \in [1, N_{RPF}]} r_j.$$

Example 43 includes at least one machine readable storage medium having instructions embodied thereon for enhancing the receiving performance of a reference signal for beam refinement, the instructions when executed by one or more processors at a user equipment (UE) perform the following: determining a receiving beam sweeping structure for each receiving beam of a plurality of receiving beams, comprising: sample the beam sweeping structure that comprises a cyclic prefix (CP) and a plurality of data repetitions, wherein: each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0; a first receiving beam of the plurality of receiving beams includes at least a portion of a cyclic prefix (CP) and at least a portion of a data repetition of the plurality of data repetitions; and each of a $N_{RPF}-1$ receiving beams of the plurality of receiving beams positioned after the first receiving beam includes at least a portion of two adjacent data repetitions; calculating the receiving power $r_j$ for each of the plurality of receiving beams, wherein r is a real number and j is a set of integers greater than or equal to 1 and less than or equal to $N_{RPF}$; and selecting a refined receiving beam having a highest receiving power $r_j$.

Example 44 includes the at least one machine readable storage medium of Example 43, further comprising instructions that when executed perform: calculating the receiving power $r_j$ for each of the plurality of receiving beams by circular correlation using:

$$r_j = \max_{k \in [0,K]} \left| \sum_{n=0}^{N-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

Example 45 includes the at least one machine readable storage medium of Example 44, further comprising instructions that when executed perform: determining an offset in a range from 0 to K by subsampling; calculating a highest offset by using:

$$q_j = \operatorname*{argmax}_{k \in [T \times [0, \lfloor K/T \rfloor]]} \left| \sum_{n=0}^{N-1} y_j[n](x[n+k]_N)^* \right|^2,$$

wherein T is a subsampling factor and a positive integer; and calculating the receiving power for each of the plurality of receiving beams using:

$$r_j = \max_{k \in [q_j - \lceil T/2 \rceil, q_j + \lceil T/2 \rceil]} \left| \sum_{n=0}^{N-1} y_j[n](x[n+k]_N)^* \right|^2.$$

Example 46 includes the at least one machine readable storage medium of Example 43, further comprising instructions that when executed perform: calculating a time domain channel by circular convolution using: $\hat{h}_j[n] = \Sigma_{m=0}^{N-1} y_j[m] \times [n-m]_N$, wherein $y_j[m]$ is a receiving beam of j and $x_j[m]$ is a transmitting beam of j; calculating the receiving power $r_j$ for each of the plurality of receiving beam using $$r_j = \max_{n \in [0, N-1]} |\hat{h}_j[n]|^2;$$

calculating a second highest receiving power, $q_j$, using:

$$q_j = \operatorname*{argmax}_{n \in [0, N-1]} |\hat{h}_j[n]|^2;$$

and calculating an average highest receiving power $r_j$ using:

$$r_j = \left| \frac{1}{\sqrt{2\Delta + 1}} \sum_{n=q_j - \Delta}^{q_j + \Delta} \hat{h}_j[n] \right|^2,$$

wherein $\Delta$ is a positive integer.

Example 47 includes the at least one machine readable storage medium of Example 43, further comprising instructions that when executed perform: determining a quality $t_j$ for each of the plurality of receiving beams by using: $t_j = r_j/(\Sigma_{n=0}^{N-1}|y_j[n]|^2 - r_j)$, wherein $y_j[n]$ is a receiving beam of j; and selecting a receiving beam having a highest quality Q using $$Q = \operatorname*{argmax}_{j \in [1, N_{RPF}]} r_j.$$

Example 48 includes the at least one machine readable storage medium of Example 43, further comprising instructions that when executed perform: calculating the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers; calculating the highest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers; or calculating a lowest receiving power from one antenna port using:

$$r_j = \min_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to enhance the receiving performance of a reference signal for beam refinement, the apparatus comprising:
one or more processors configured to:
determine a receiving beam sweeping structure for each receiving beam of a plurality of receiving beams, comprising:
sample the beam sweeping structure that comprises a cyclic prefix (CP) and a plurality of data repetitions, wherein:
each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0;
a first receiving beam of the plurality of receiving beams includes at least a portion of a cyclic prefix (CP) and at least a portion of a data repetition of the plurality of data repetitions; and
each of a $N_{RPF}-1$ receiving beams of the plurality of receiving beams positioned after the first receiving beam includes at least a portion of two adjacent data repetitions;
calculate the receiving power $r_j$ for each of the plurality of receiving beams, wherein r is a real number and j is a set of integers greater than or equal to 1 and less than or equal to $N_{RPF}$; and
select a refined receiving beam having a highest receiving power $r_j$; and
a memory interface configured to send the refined receiving beam having the highest receiving power to a memory.

2. The apparatus of claim 1, wherein the one or more processors are further configured to:
calculate the receiving power $r_j$ for each of the plurality of receiving beams by circular correlation using:

$$r_j = \max_{k \in [0,K]} \left| \sum_{n=0}^{M-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

3. The apparatus of claim 2, wherein the one or more processors are further configured to:
determine an offset in a range from 0 to K by subsampling;
calculate a highest offset by using:

$$q_j = \underset{k \in [T \times [0, \lfloor K/T \rfloor]]}{\mathrm{argmax}} \left| \sum_{n=0}^{N-1} y_j[n](x[n+k]_N)^* \right|^2,$$

wherein T is a subsampling factor and a positive integer; and
calculate the receiving power for each of the plurality of receiving beams using:

$$r_j = \underset{k \in [Q_j - \lceil T/2 \rceil, q_j + \lceil T/2 \rceil]}{\mathrm{argmax}} \left| \sum_{n=0}^{N-1} y_j[n](x[n+k]_N)^* \right|^2.$$

4. The apparatus of claim 1, wherein the one or more processors are further configured to:
calculate a time domain channel by circular convolution using: $\hat{h}_j[n] = \sum_{m=0}^{N-1} [m] \times [n-m]_N$, wherein $y_j[m]$ is a receiving beam of j and $x_j[m]$ is a transmitting beam of j; and
calculate the receiving power $r_j$ for each of the plurality of receiving beams using:

$$r_j = \max_{n \in [0, N-1]} \left| \hat{h}_j[n] \right|^2.$$

5. The apparatus of claim 4, wherein the one or more processors are further configured to:
calculate a second highest receiving power, $q_j$, using:

$$q_j = \underset{n \in [0, N-1]}{\mathrm{argmax}} \left| \hat{h}_j[n] \right|^2;$$

and
calculate an average highest receiving power $r_j$ using:

$$r_j = \left| \frac{1}{\sqrt{2\Delta + 1}} \sum_{n=q_j - \Delta}^{q_j + \Delta} \hat{h}_j[n] \right|^2,$$

wherein $\Delta$ is a positive integer.

6. The apparatus of claim 1, wherein the one or more processors are further configured to:
determine a quality $t_j$ for each of the plurality of receiving beams by using: $t_j = r_j/(\sum_{n=0}^{N-1} |y_j[n]|^2 - r_j)$, wherein $y_j[n]$ is a receiving beam of j; and
select a receiving beam having a highest quality Q using $$Q = \underset{j \in [1, N_{RPF}]}{\mathrm{argmax}} r_j.$$

7. The apparatus of claim 1, wherein the one or more processors are further configured to:
calculate the highest receiving power using:

$$r_j = \frac{1}{MQ}\sum_{m=0}^{M-1}\sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

8. The apparatus of claim 1, wherein the one or more processors are further configured to:
calculate the highest receiving power from one antenna port using:

$$r_j = \min_{q\in[0,Q-1]} \frac{1}{M}\sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

9. The apparatus of claim 1, wherein the one or more processors are further configured to:
calculate a lowest receiving power from one antenna port using:

$$r_j = \min_{q\in[0,Q-1]} \frac{1}{M}\sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

10. An apparatus of a user equipment (UE) operable to enhance the receiving performance of a reference signal for beam refinement, the apparatus comprising:
one or more processors configured to:
determine a receiving beam sweeping structure for each receiving beam of a plurality of receiving beams, comprising:
sample a selected portion of the beam sweeping structure that comprises a cyclic prefix (CP) and a plurality of j data repetitions, wherein the selected portion includes:
a portion of the CP with a length $N_{CP}/N_{RPF}$;
remove the portion of the CP with the length $N_{CP}/N_{RPF}$;
determine a frequency domain channel for each of the j data repetitions using a matched filter using $H_j[k]=Y_j[k](X_j[k])^*$, wherein $Y_j[k]$ is a receiving beam signal and $X_j[k]$ is a transmitting beam signal;
calculate the receiving power $r_j$ for each of the plurality of receiving beams, wherein r is a real number and j is a set of integers greater than or equal to 1 and less than or equal to $N_{RPF}$; and
select a refined receiving beam having a highest receiving power $r_j$; and
a memory interface configured to send the refined receiving beam having the highest power to a memory.

11. The apparatus of claim 10, wherein the one or more processors are further configured to:
calculate the receiving power $r_j$ of each of the plurality of receiving beams using:

$$\left\{ r_j = \frac{1}{N}\sum_{q=0}^{\lfloor(N-1)/\Delta\rfloor}\left|\sum_{k=\Delta q}^{\Delta(q+1)} H_j[k]\right|^2 \right.,$$

wherein N is a length of a data repetition and is a real number, and wherein $\Delta$ is a positive integer.

12. The apparatus of claim 10, wherein the one or more processors are further configured to:
calculate the receiving power based on the signal after filtering.

13. The apparatus of claim 10, wherein the one or more processors are further configured to:
determine a quality $t_j$ for each of the plurality of receiving beams by using: $t_j=r_j/(\sum_{n=0}^{N-1}|y_j[n]|^2-r_j)$, wherein $y_j[n]$ is a receiving beam of j; and
select a receiving beam having a highest quality Q using $$Q = \operatorname*{argmax}_{j\in[1,N_{RPF}]} r_j.$$

14. The apparatus of claim 10, wherein the one or more processors are further configured to:
calculate the highest receiving power using:

$$r_j = \frac{1}{MQ}\sum_{m=0}^{M-1}\sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

15. The apparatus of claim 10, wherein the one or more processors are further configured to:
calculate a lowest receiving power from one antenna port using:

$$r_j = \min_{q\in[0,Q-1]} \frac{1}{M}\sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

16. At least one non-transitory machine readable storage medium having instructions embodied thereon for enhancing the receiving performance of a reference signal for beam refinement, the instructions when executed by one or more processors at a user equipment (UE) perform the following:
determining a receiving beam sweeping structure for each receiving beam of a plurality of receiving beams, comprising:

sample the beam sweeping structure that comprises a cyclic prefix (CP) and a plurality of data repetitions, wherein:
- each receiving beam is associated with $N+N_{CP}/N_{RPF}$ samples, wherein N is a length of a data repetition, $N_{CP}$ is a CP length, and $N_{RPF}$ is a number of data repetitions, and wherein each of N, $N_{CP}$, $N_{RPF}$ is an integer greater than 0;
- a first receiving beam of the plurality of receiving beams includes at least a portion of a cyclic prefix (CP) and at least a portion of a data repetition of the plurality of data repetitions; and
- each of a $N_{RPF}-1$ receiving beams of the plurality of receiving beams positioned after the first receiving beam includes at least a portion of two adjacent data repetitions;

calculating the receiving power $r_j$ for each of the plurality of receiving beams, wherein r is a real number and j is a set of integers greater than or equal to 1 and less than or equal to $N_{RPF}$; and selecting a refined receiving beam having a highest receiving power $r_j$.

17. The at least one non-transitory machine readable storage medium of claim 16, further comprising instructions that when executed perform:
calculating the receiving power $r_j$ for each of the plurality of receiving beams by circular correlation using:

$$r_j = \max_{k \in [0,K]} \left| \sum_{m=0}^{M-1} y_j[n](x[n+k]_N)^* \right|^2,$$

wherein k is a positive integer greater than or equal to 0, K is a positive integer, $y_j[n]$ is a receiving beam of j, and $x_j[n]$ is a transmitting beam of j.

18. The at least one non-transitory machine readable storage medium of claim 17, further comprising instructions that when executed perform:
determining an offset in a range from 0 to K by subsampling;
calculating a highest offset by using:

$$q_j = \operatorname*{argmax}_{k \in [T \times [0, \lfloor K/T \rfloor]]} \left| \sum_{n=0}^{N-1} y_j[n](x[n+k]_N)^* \right|^2,$$

wherein T is a subsampling factor and a positive integer; and
calculating the receiving power for each of the plurality of receiving beams using:

$$r_j = \max_{k \in [q_j - \lfloor T/2 \rfloor, q_j + \lfloor T/2 \rfloor]} \left| \sum_{n=0}^{N-1} y_j[n](x[n+k]_N)^* \right|^2.$$

19. The at least one non-transitory machine readable storage medium of claim 16, further comprising instructions that when executed perform:
calculating a time domain channel by circular convolution using: $\hat{h}_j[n] = \sum_{m=0}^{N-1} y_j[m] \times [n-m]_N$, wherein $y_j[m]$ is a receiving beam of j and $x_j[m]$ is a transmitting beam of j; and
calculating the receiving power $r_j$ for each of the plurality of receiving beams using:

$$r_j = \max_{n \in [0, N-1]} |\hat{h}_j[n]|^2.$$

20. The at least one non-transitory machine readable storage medium of claim 19, further comprising instructions that when executed perform:
calculating a second highest receiving power, $q_j$, using:

$$q_j = \operatorname*{argmax}_{n \in [0, N-1]} |\hat{h}_j[n]|^2;$$

and
calculating an average highest receiving power $r_j$ using:

$$r_j = \left| \frac{1}{\sqrt{2\Delta + 1}} \sum_{n=q_j - \Delta}^{q_j + \Delta} \hat{h}_j[n] \right|^2,$$

wherein $\Delta$ is a positive integer.

21. The at least one non-transitory machine readable storage medium of claim 16, further comprising instructions that when executed perform:
determining a quality $t_j$ for each of the plurality of receiving beams by using: $t_j = r_j / (\sum_{n=0}^{N-1} |y_j[n]|^2 - r_j)$, wherein $y_j[n]$ is a receiving beam of j; and
selecting a receiving beam having a highest quality Q using $$Q = \operatorname*{argmax}_{j \in [1, N_{RPF}]} r_j.$$

22. The at least one non-transitory machine readable storage medium of claim 16, further comprising instructions that when executed perform:
calculating the highest receiving power using:

$$r_j = \frac{1}{MQ} \sum_{m=0}^{M-1} \sum_{n=0}^{Q-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

23. The at least one non-transitory machine readable storage medium of claim 16, further comprising instructions that when executed perform:
calculating the highest receiving power from one antenna port using:

$$r_j = \max_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

24. The at least one non-transitory machine readable storage medium of claim 16, further comprising instructions that when executed perform:

calculating a lowest receiving power from one antenna port using:

$$r_j = \min_{q \in [0, Q-1]} \frac{1}{M} \sum_{m=0}^{M-1} r_j^{(m,q)},$$

wherein $r_j^{(m,q)}$ is the receiving power between a receiving antenna port m and a transmitting antenna port q, M is the number of receiving antenna ports, and Q is the number of transmitting antenna ports, and wherein m, q, M, and Q are all positive integers.

* * * * *